United States Patent [19]

Lickei et al.

[11] 4,135,042

[45] Jan. 16, 1979

[54] REDUCTION OF SCORCHING IN POLYURETHANE FOAM

[75] Inventors: Donald L. Lickei, Wallingford; Clifford J. Maxwell, New Haven, both of Conn.

[73] Assignee: Olin Corporation, New Haven, Conn.

[21] Appl. No.: 843,184

[22] Filed: Oct. 18, 1977

[51] Int. Cl.$^2$ .................. C08K 5/52; C08G 18/14; C08G 18/48
[52] U.S. Cl. .................................... 521/107; 521/174
[58] Field of Search ................. 260/2.5 AJ, 2.5 BB

[56] References Cited

U.S. PATENT DOCUMENTS

| | | | |
|---|---|---|---|
| 3,205,269 | 9/1965 | Friedman | 260/2.5 BB |
| 3,214,397 | 10/1965 | Cox | 260/2.5 BB |
| 3,354,241 | 11/1967 | Larrison | 260/2.5 BB |
| 3,429,837 | 2/1969 | Langrish | 260/2.5 BB |
| 3,573,251 | 3/1971 | Megna | 260/2.5 BB |
| 3,707,586 | 12/1972 | Turley | 260/928 |
| 3,817,881 | 6/1974 | Turley | 260/2.5 AJ |
| 3,847,843 | 11/1974 | Dany | 260/2.5 BB |
| 3,928,505 | 12/1975 | Klicker | 260/2.5 AM |
| 4,045,378 | 8/1977 | Maxwell | 260/2.5 AJ |

*Primary Examiner*—C. Warren Ivy
*Attorney, Agent, or Firm*—F. A. Iskander; Robert J. Feltovic; Thomas P. O'Day

[57] ABSTRACT

Use of phosphites as scorch inhibitors in polyurethane foams containing halogenated phosphate polyester additives.

13 Claims, No Drawings

REDUCTION OF SCORCHING IN POLYURETHANE FOAM

BACKGROUND OF THE INVENTION

A. Field of Invention

This invention relates to an improvement connected with the production of polyurethane foams which are obtained from reaction mixtures containing halogenated phosphate polyester additives. More particularly, the improvement pertains to the reduction or elimination of scorching in such foams.

B. Description of the Prior Art

Various phosphorus-containing, halogenated compounds have been used as additives to reduce the combustibility of polyurethane foams. For this utility, certain halogenated phosphate polyesters have been found to be particularly effective. See U.S. Pat. No. 3,817,881; No. 3,707,586; and No. 3,157,613.

However, in some commercial applications, particularly in the preparation of flexible foam from formulations containing a relatively high level of water, the inclusion of these additives may cause scorching in the cured polyurethane foam product. This is usually evidenced by noticeable foam discoloration which, if pronounced or severe, often is indicative of structural weaknesses in the foam body. Moreover, severe or pronounced discoloration, in itself, is undesirable from an appearance and product marketability standpoint. See U.S. Pat. No. 3,214,397 for a more detailed description of this scorching problem.

Further in the prior art, a number of additives have been proposed to eliminate or reduce this scorching phenomenon. Most pertinent hereto is U.S. Pat. No. 4,045,378 which teaches the use of hydroquinone as a scorch inhibitor in polyurethane foams containing halogenated phosphate polyester additives.

BRIEF SUMMARY OF THE INVENTION

Now it has been found that aliphatic phosphites are effective in reducing or eliminating the problem of foam scorching. Thus according to the invention an improvement is provided in the process of preparing polyurethane foams from a reaction mixture comprising a halogenated phosphate polyester, the improvement comprised of including in the mixture an effective or scorch-inhibitive amount of an aliphatic phosphite.

DETAILED DESCRIPTION

Any aliphatic phosphite may be employed in practicing the method of the invention. For reasons not yet fully understood, it has been found that whereas all aliphatic phosphites tested are effective as scorch retarding or inhibiting agents in foams containing halogenated polyphosphate esters, this is not the case with aromatic phosphites. Thus broadly speaking, while the concept of the invention applies to the use of any aliphatic phosphite, it specifically excludes the use of aromatic phosphites.

The aliphatic phosphites include the mono- and di-phosphites represented for example by formulas I and II, respectively:

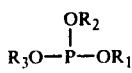

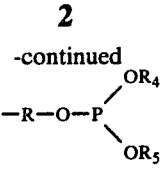

wherein each of the radicals R and $R_1$ through $R_7$ is independently an aliphatic hydrocarbon radical containing only carbon atoms, hydrogen atoms and optionally oxygen and/or halogen atoms, the halogen being chlorine, bromine or a mixture thereof. Usually, the radical R may have 1-20, preferably 2-6, carbon atoms, and each of $R_1$ through $R_7$ contains 1-20, preferably 3-18, carbon atoms.

The diphosphites also include for example the pentaerythrityl diphosphites, some of which are readily available commercial materials. These pentaerythrityl diphosphites may be represented by the formula:

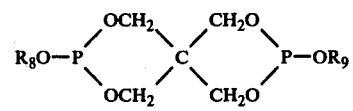

wherein each of $R_8$ and $R_9$ is independently alkyl or haloalkyl, the halogen being chlorine, bromine or a mixture thereof. These radicals usually contain 1-20, preferably 1-10, carbon atoms.

Illustrative phosphites for use herein include the following:
trimethyl phosphite
triethyl phosphite
tris(2-chloroethyl)phosphite
tris(2-bromoethyl)phosphite
tris(2,2,2-trichloroethyl)phosphite
tris(2-methoxyethyl)phosphite
tris(2-chloropropyl)phosphite
tris(2-propynyl)phosphite
tris(2-propenyl)phosphite
tributyl phosphite
triisooctyl phosphite
triisodecyl phosphite
tris(2-hexyldecyl)phosphite
tris(2-octyldecyl)phosphite
tris(dipropylene glycol)phosphite
ethyl dimethyl phosphite
dimethyl propyl phosphite
diethyl propyl phosphite
diethyl(2-chloroethyl)phosphite
dipropyl(1,3-dichloroisopropyl)phosphite
dipropyl butyl phosphite
bis(1,3-dichloro isopropyl)butyl phosphite
bis(1,3-dichloro isopropyl)amyl phosphite
dicyclohexyl propyl phosphite
dicyclohexyl butyl phosphite
ethylmethylpropyl phosphite
methyl propyl isoamyl phosphite
tetramethyl-1,4-cyclohexylidene diphosphite
tetramethyldiethyleneoxy diphosphite
tetrabutyldiethyleneoxy diphosphite
tetrakis(2-chloropropyl)diethyleneoxy diphosphite
bis(methyl)pentaerythrityl diphosphite
bis(ethyl)pentaerythrityl diphosphite
bis(2-chloropropyl)pentaerythrityl diphosphite
bis(2-ethylhexyl)pentaerythrityl diphosphite
di(isodecyl)pentaerythrityl diphosphite In the case of the monophosphites, it is especially preferred to employ those compounds of formula I wherein $R_1$, $R_2$, and $R_3$ are identical such as triethyl phosphite, tris(2-chloroethyl)phosphite, tris(2-methoxyethyl)phosphite and tris(dipropylene glycol)phosphite. Likewise in the case of the diphosphites, it is especially preferred to employ those compounds of formula II wherein $R_4$, $R_5$, $R_6$, and $R_7$ are identical and those of formula III wherein $R_8$ and $R_9$ are identical. Illustrative such compounds include tetramethyl diethyleneoxy diphosphite, tetrakis(2-chloropropyl)diethyleneoxy diphosphite, bis(ethyl)pentaerythrityl diphosphite, and bis(isodecyl)pentaerythrityl diphosphite.

The most preferred mono- and diphosphites for use according to the invention are those represented by formulas I, II, and III and illustrated hereinabove which are hydrolytically stable and have a boiling point above about 200° C.

The halogenated phosphate polyester which is employed as an additive to reduce the combustibility of the foam can be any such prior art material. Illustrative are those esters which are represented by the formula:

(IV)

wherein
R' is an aliphatic hydrocarbon radical having 1-8 carbon atoms, or an aromatic hydrocarbon radical having 6-14 carbon atoms, X is a halogen selected from chlorine, bromine and and a mixture thereof, a is an integer of 0-4, n is an integer of 2-6, and each R" is independently a haloalkyl radical having 1-8 carbon atoms, the halogen in this radical being chlorine, bromine or a mixture thereof.

These polyesters and their preparation are described in U.S. Pat. No. 3,707,586 and No. 3,817,881, which issued to Richard J. Turley on Dec. 26, 1972 and June 18, 1974, respectively.

Preferred polyesters for use according to the invention are those of formula IV above wherein R' represents an aliphatic hydrocarbon radical having 1-8 carbon atoms, all the radicals represented by R" are identical and n is 2. Furthermore, it is generally more preferred to employ those polyesters of formula IV wherein all the halogens are chlorine, i.e., X is chlorine and all the radicals represented by R" are chloroalkyl.

Illustrative of the preferred polyesters are the following:

tetrakis(2-chloroethyl)ethylene diphosphate
tetrakis(2-chloroisopropyl)ethylene diphosphate
tetrakis(2-chloroethyl)p-phenylene diphosphate
tetrakis(2-chloroethyl)m-phenylene phosphate
tetrakis(2-chloroethyl)tetrachloro-p-phenylene diphosphate
tetrakis(2-bromoethyl)ethylene diphosphate
tetrakis(2-chloroethyl)-2-butene-1,4-diphosphate
tetrakis(2-chloroethyl)-2,3-dibromobutylene-1,4-diphosphate
tetrakis(2-bromoisopropyl)ethylene diphosphate
2,2-bis(chloromethyl)-1,3-propylene-bis[bis(2-chloroethyl)phosphate]
2,2-bis(chloromethyl)-1,3-propylene-bis[bis(2-bromoethyl)phosphate]
2,2-bis(chloromethyl)-1,3-propylene-bis[bis(2-chloropropyl)phosphate]
2,2-bis(bromomethyl)-1,3-propylene-bis[bis(2-bromoethyl)phosphate]2,2-bis(bromoethyl)-1,3-propylene-bis[bis(2-chloroethyl)phosphate]
tetrakis(2,3-dichloropropyl)ethylene diphosphate
tetrakis(2,3-dibromopropyl)ethylene diphosphate
tetrakis(2-bromoethyl)-2-butene-1,4-diphosphate A particularly preferred group of phosphate polyesters are those represented by formula V as follows:

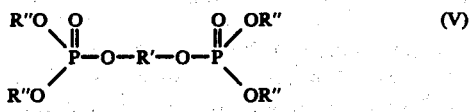

(V)

wherein
R" is a chloroalkyl radical having 1-8, and more preferably 1-4, carbon atoms, and R' is an alkylene radical having 1-8, and more preferably 1-4, carbon atoms.

Compounds which are illustrative of those represented by formula V include tetrakis(2-chloroethyl)ethylene diphosphate, tetrakis(2-chloroisopropyl)ethylene diphosphate and tetrakis(2-chloroethyl)-2-butene-1,4-diphosphate.

The polyesters of formula IV are utilized as additives in flexible, semi-rigid and rigid polyurethane foam compositions. In preparing the polyurethane foams of the invention, either the so-called "one-shot method" of the "prepolymer technique" may be employed. Any combination of polyols, including polyether polyols and polyester polyols, organic polyisocyanate, foaming agent, catalyst and other reactants capable of forming a flexible urethane foam can be employed, and the term "polyurethane foam formulation" in the specification and claims herein is intended to include the product of any such combination. Typical formulations are described in U.S. Pat. No. 3,072,582, issued Jan. 8, 1963 and Canadian Pat. No. 705,938, issued Mar. 16, 1965.

While, as indicated above, both polyether and polyester polyols can be employed in the practice of this invention, preferred embodiments utilize polyether polyols in the preparation of the polyurethane foam-forming reaction mixture. Any suitable polyether polyols may be used for this purpose. These polyether polyols usually have a hydroxyl number, for example, from about 25 to about 800.

The polyether polyols include, for example, oxyalkylated polyhydric alcohols having a molecular weight range of about 200-10,000 and preferably between about 250-8,000. These oxyalkylated polyhydric alcohols are generally prepared by methods well known in the art such as reacting, in the presence of an alkaline catalyst, a polyhydric alcohol and an alkylene oxide such as ethylene oxide, propylene oxide, butylene oxide, amylene oxide, epichlorohydrin and mixtures of these alkylene oxides, using either random or step-wise addition.

Polyhydric alcohols suitable for use in preparing the polyether polyols include ethylene glycol, pentaerythritol, methyl glucoside, propylene glycol, 2,3-butylene glycol, 1,3-butylene glycol, 1,5-pentane diol, 1,6-hexane diol, glycerol, trimethylolpropane, sorbitol, sucrose, dextrose, mixtures thereof and the like. If desired, a portion or all of the polyhydric alcohol may be replaced with another compound having at least two reactive hydrogen atoms, such as alkyl amines, alkylene polyamines, cyclic amines, amides and polycarboxylic acids. Suitable alkyl amines and alkylene polyamines include methylamine, ethylamine, propylamine, butylamine, hexylamine, ethylenediamine, 1,6-hexanediamine, diethylenetriamine and the like. Also, sucy cyclic amines as piperazine, 2-methylpiperazine and 2,5-dimethylpiperazine can also be used. Amides, such as acetamide, succinamide and benzenesulfonamide, constitute a further class of such reactive hydrogen compounds. A still further class of such reactive hydrogen compounds is the di- and polycarboxylic acids, such as adipic, acid succinic acid, glutaric acid, aconitric acid, diglycollic acid and the like. It will be recognized that the reaction hydrogen compound can be one containing different functional groups having reactive hydrogen atoms, such as citric acid, glycollic acid, ethanolamine and the like. Aromatic polyamines such as toluene diamine may also be employed. Mixtures of oxyalkylated polyhydric alcohols are also suitable for use in the process of this invention.

Although, as indicated above, the polyurethane foams of the invention can be flexible, semi-rigid, or rigid, the flexible foams are preferred. Therefore, in preparing the polyurethane foam in accordance with this preferred embodiment of the invention, a polyether polyol is used having a molecular weight of about 2,000–7,000, and more preferably about 2,500–6,000.

The organic polyisocyanate used in the preparation of the polyurethane foams include toluene diisocyanate, such as the 4:1 by weight mixture or the 65:35 by weight mixture of the 2,4- and 2,6-isomers, ethylene diisocyanate, propylene diisocyanate, methylenebis-4-phenyl isocyanate, 3,3'-bitoluene-4,4'-diisocyanate, hexamethylene diisocyanate, naphthalene-1,5-diisocyanate, polyphenylene polymethylene isocyanate, mixtures thereof and the like. The preferred organic polyisocyanate is toluene diisocyanate. The amount of isocyanate employed in the process of this invention should be sufficient to provide at least about 0.7 NCO group per hydroxyl group present in the reaction system, which includes the polyol as well as any additive or foaming agent employed. An excess of isocyanate compound may be conveniently employed; however, this is generally undesirable due to the high cost of the isocyanate compounds. It is preferable, therefore, to employ sufficient isocyanate to provide no greater than about 1.25 NCO groups per hydroxyl group, and preferably between about 0.9 and about 1.15 NCO groups per hydroxyl group. The ratio of NCO to OH groups times 100 is referred to as the "index".

The polyurethane foams are prepared in the presence of a foaming agent which may be any of those known to be useful for this purpose. Illustrative are water and organic foaming agents containing up to about seven carbon atoms such as the halogenated hydrocarbons, lower molecular weight alkanes, alkenes, ethers and mixtures thereof. Typical halogenated hydrocarbons include, but are not limited to: monofluorotrichloromethane, dichlorofluoromethane, difluorodichloromethane, 1,1,2-trichloro-1,2,2-trifluoroethane, dichlorotetrafluoroethane, ethylene dichloride. Other useful foaming agents include lower molecular weight alkanes, alkenes and ethers such as methane, ethane, ethylene, propane, propylene, pentane, hexane, heptane, ethyl ether, diisopropyl ether, mixtures thereof and the like. The amount of foaming agent employed may be varied within a wide range. Generally, however, the halogenated hydrocarbons are employed in an amount from about 1 to about 50, and preferably about 5–35, parts per 100 parts by weight of the polyol, and generally water, the use of which is preferred, is employed in an amount from about 1.0 to 6.0 parts by weight per 100 parts by weight of the polyol.

The polyurethane foams are prepared in the presence of a catalytic amount of a reaction catalyst. The catalyst employed may be any of the catalysts known to be useful for this purpose, such as tertiary amines and metallic salts, particularly stannous salts and mixtures thereof. Typical tertiary amines include, but are not limited to, the following: N-ethyl morpholine, N-hydroxyethyl morpholine, triethylene diamine, triethylamine, and trimethylamine. Typical metallic salts include, for example, the salts of antimony, tin and iron, e.g., dibutyltin dilaurate, stannous octoate and the like. Any catalytic proportion of catalyst or catalyst mixture may be employed such as between about 0.1 and about 3.0 percent, and preferably between about 0.5 and about 2.5 percent, by weight of the polyol.

It is preferred in the preparation of the polyurethane foams of the present invention to employ minor amounts of a conventional surfactant in order to further improve the cell structure of the polyurethane foam. Typical of such surfactants are the silicones and the siloxaneoxyalkylene block copolymers. U.S. Pat. No. 2,834,748 and T. H. Ferrigno, *Rigid Plastic Foams* (New York: Reinhold Publishing Corp., 1963) pages 38–42, disclose various surfactants which are useful for this purpose. Generally up to 2 parts by weight of the surfactant are employed per 100 parts of the polyol.

In utilizing the polyesters of formula IV to prepare the polyurethane foam of the invention, they are usually added to the polyurethane foam-forming reaction mixture prior to foaming. Conveniently, they are first blended with the polyol component used in making the foam and the blend is then added to the other ingredients of the polyurethane foam-forming reaction mixture. The proportion of the polyester which is used is not limited to any particular amount or range so long as its inclusion in the foam-forming reaction mixture imparts reduced combustibility characteristics to the foam without otherwise detrimentally affecting the other properties of the foam. For example, in practice, a proportion of the polyester may be used which ranges from about 2 to about 30 parts per 100 parts by weight of total polyol employed in making the foam. However, higher as well as lower proportions may be used, if desired. A particularly preferred proportion range is about 5–20 parts per 100 parts by weight of polyol.

The present invention is particularly suited for relatively high water/low density flexible foams because scorching problems are more likely to occur in these types of foams than any other. The term "high water" is usually defined in the art to mean that about 3.6–5.5 parts, preferably about 4.0–4.8 parts, by weight of water is employed per 100 parts by weight of polyol. And, "low density" is usually used to mean that the resultant foam has a density of about 0.7–1.6 pounds per cubic foot.

In practicing the improved process of the present invention, any suitable proportion of the phosphite may be used which is effective in reducing foam scorching without otherwise having an adverse effect on the foam-forming reaction. Thus, as used in the specification and claims herein, the terms "effective amount" and "scorch-inhibitive amount", are intended to mean and encompass any such proportion. Illustratively, the scorch-inhibitive amount may range from about 0.1 to about 5 parts per every 100 parts by weight of the halogenated phosphate polyester. A preferred range is about 0.3–2.5, and still more preferably about 0.5–2.0, parts per 100 parts by weight of the halogenated phosphate polyester.

Conveniently, the phosphite may be initially added to the halogenated phosphate polyester before the latter is in turn added to, and mixed with, the foam-forming reaction mixture. However, if desired, the phosphite may be separately added to the foam-forming mixture.

The following examples are provided to illustrate the invention. All parts and percentages in these examples are by weight unless otherwise specified.

EXAMPLE I

A flexible polyurethane foam was prepared by hand-mixing together the following ingredients in the indicated proportions.

| Ingredients | Parts by Weight |
| --- | --- |
| Oxypropylated glycerin, molec. wt. 3000 | 100.0 |
| Triethylene diamine* | 0.3 |
| Stannous octoate | 0.25 |
| Silicone surfactant** | 1.5 |
| Water | 4.8 |
| Toluene diisocyanate (80/20 mixture of 2,4/2,6-isomers) | 49.6 |
| Tetrakis(2-chloroethyl)ethylene diphosphate | 15.0 |
| Tris(2-chloroethyl)phosphite | 0.3 |

*This is a commercial product sold under the designation or trademark "Dabco 33LV" and consisting of 33% of triethylene diamine, the balance being mainly dipropylene glycol.
**This is a polydimethylsiloxane-polyester copolymer, another commercial product sold under the trademark or designation "DC-190".

The above ingredients were poured into a cardboard box where the foaming reaction took place. After curing, the resulting foam bun was sliced in half and the center portion of the foam was examined visually for discoloration. Only slight-to-moderate discoloration (dark yellow color) was noted.

Comparison 1

The same procedure of Example I was followed except that no tris(2-chloroethyl)phosphite was included in the foam-forming reaction mixture. On examination, the center portion of the foam had a dark brown color indicating severe scorching. This comparison demonstrates that, in the absence of a scorch inhibitor as used in Example I, excessive discoloration and severe scorching occur in the body of the foam bun.

EXAMPLES II–IV

Again the procedure of Example I was followed except for variations in the scorch inhibitors which were used. Thus in Example II, the scorch inhibitor was tris(dipropyleneglycol)phosphite and this was used in the amount of 0.15 part. In Example III, 0.15 part of di(isodecyl)pentaerythrityl diphosphite was used as the scorch inhibitor. Finally in Example IV, 0.15 part, rather than 0.30 part, of tris(2-chloroethyl)phosphite was used. The results of these examples, as well as of Example I and Comparison 1 are outlined in the following table.

TABLE

| Example or Comparison | Scorch Inhibitor Used/Amount | Discoloration |
| --- | --- | --- |
| Comparison 1 | None | Severe |
| Example I | Tris(2-chloroethyl)phosphite/0.30 | Slight-moderate |
| Example II | Tris(dipropyleneglycol)phosphite/0.15 | Moderate |
| Example III | Di(isodecyl)pentaerythrityl diphosphite/0.15 | Moderate |

Comparison 2

The procedure of the preceding examples was followed except that here 0.15 part of an aromatic phosphite, namely, triphenyl phosphite, was used in lieu of the various scorch inhibitors specified in the preceding examples. Severe brown discoloration in the center portion of the foam bun was noted. This demonstrates that not all phosphites are effective as scorch inhibitors. Thus the aromatic phosphite used in this comparison exhibited no effect as a scorch inhibitor.

What is claimed is:

1. In a process for making polyurethane foam from a reaction mixture comprised of a polyether polyol, an organic polyisocyanate, a foaming agent and a halogenated phosphate polyester additive represented by the formula:

wherein
R' is an aliphatic hydrocarbon having 1–8 atoms or an aromatic hydrocarbon radical having 6–14 carbon atoms,
X is a halogen selected from chlorine, bromine, and a mixture thereof,
a is an integer of 0–4,
n is an integer of 2–6, and
each R" is a haloalkyl radical having 1–8 carbon atoms, the halogen in this radical being chlorine, bromine, or a mixture thereof,
the improvement which comprises including in said reaction mixture a scorch-inhibitive amount of an aliphatic phosphite selected from cyclic and acyclic aliphatic phosphites.

2. The process of claim 1 wherein said foam is flexible and said polyol is a polyether polyol.

3. The process of claim 2 wherein said foaming agent is comprised of water.

4. The process of claim 3 wherein said halogenated phosphate polyester is represented by the formula

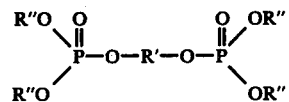

wherein R" is a chloroalkyl radical having 1–4 carbon atoms and R' is an alkylene radical having 1–4 carbon atoms.

5. The process of claim 4 wherein said halogenated phosphate polyester is tetrakis(2-chloroethyl)ethylene diphosphate.

6. The process of claim 4 wherein said polyether polyol is an oxyalkylated polyhydric alcohol having a molecular weight of about 2,500–6,000.

7. The process of claim 6 wherein said organic polyisocyanate is toluene diisocyanate.

8. The process of claim 6 wherein said aliphatic phosphite is represented by a formula selected from the group consisting of

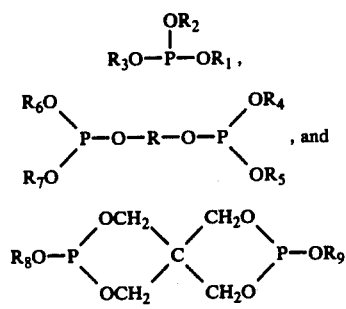

wherein each of R and $R_1$ through $R_7$ is independently an aliphatic hydrocarbon radical containing only carbon atoms, hydrogen atoms, and optionally oxygen and/or halogen atoms, the halogen being chlorine, bromine, or a mixture thereof, and wherein each of $R_8$ and $R_9$ is independently alkyl or haloalkyl, the halogen being chlorine, bromine, or a mixture thereof.

9. The process of claim 8 wherein R contains 2-6 carbon atoms, each of $R_1$ through $R_7$ contains 3-18 carbon atoms and each of $R_8$ and $R_9$ contains 1-10 carbon atoms.

10. The process of claim 9 wherein $R_1$, $R_2$ and $R_3$ are the same, $R_4$ through $R_7$ are the same and $R_8$ and $R_9$ are the same.

11. The process of claim 10 wherein a hydrolytically stable phosphite having a boiling point above about 200° C. is employed.

12. The process of claim 11 wherein said polyether polyol is a triol, said organic polyisocyanate is toluene diisocyanate, and said halogenated phosphate polyester is tetrakis(2-chloroethyl)ethylene diphosphate.

13. The process of claim 12 wherein said phosphite is selected from the group consisting of tris(2-chloroethyl)phosphite, tris(dipropyleneglycol)phosphite, and di(isodecyl)pentaerythrityl diphosphite.

* * * * *